455-609 AU 233 EX
FIP8106 XR 2,861,165

Nov. 18, 1958 P. AIGRAIN ET AL 2,861,165

F5-5-53

INFRA-RED EMITTING DEVICE

Filed May 4, 1954 infra-red radiating semiconductor using the Weierstrass point of sphere.

2,861,165

INFRA-RED EMITTING DEVICE

Pierre Aigrain and Claude Benoit a la Guillaume, Paris, France, assignors to Compagnie Generale Telegraphie Sans Fil, a corporation of France Application May 4, 1954, Serial No. 427,522

Claims priority, application France May 5, 1953

5 Claims. (Cl. 219—34)

The present invention is concerned with transmitters of light, for example in the infra-red spectrum, capable of being directly modulated. More particularly, it relates to such transmitters intended for use in communications by means of infra-red rays, especially in telephone communications.

Transmitting devices in the infra-red spectrum have been proposed before. Such devices make use either of a pin-hole source of white light in conjunction with an infra-red filter, or of luminous discharge tubes rich in infra-red rays. Such devices are rather unwieldy and require a comparatively high modulating energy. In addition, they can be used only with optical systems which, more often than not, are complicated.

The present invention has as its object to provide an infra-red ray emitting device of comparatively small volume, having a high degree of efficiency and requiring a relatively low modulating energy. In addition, this device has the advantage of being suitable for modulation at high frequencies and is capable of concentrating in a given direction the luminous energy emitted, with or without the help of an optical system, which system is in any case simple and compact.

The invention is based on the property of certain semi-conducting bodies to emit infra-red rays, when associated with a source of D. C. energy through a rectifying contact, the latter being so poled as to inject "minority carriers" in the body.

Experience shows that such luminous radiation is confined to a limited area, in the immediate neighbourhood of the contact, and that this area may be considered as a pin-hole source of light.

It is also known that semi-conducting bodies contain free charge carriers which may be either negative electrons or positive "holes," according to the nature of the impurities present in the body. In the so-called "n type" semi-conductors, i. e. conductors with free electrons, there exists a so-called "equilibrium density" of positive "holes," the latter being called "minority carriers." Likewise, the minority carriers in a semi-conductor of p type (i. e. with predominating positive holes) are electrons.

As is known, it is possible to inject into a semi-conductor body "minority carriers" in excess of the equilibrium density, through using a rectifier contact which may be either of the point-contact, or junction type.

It has been found that the "minority carriers" thus injected into the semi-conductor do not remain in their original form. They combine rapidly with the normal free carriers present in the semi-conductor and their decay time is variable, ranging from say, a fraction of a microsecond to a millisecond. At the same time, "minority carriers" penetrate the semi-conductor down to a short distance from the point where they are injected (approx. 0.1 mm.).

It has been discovered that, under these conditions, germanium emits photons in the infra-red band ($\lambda=1.9\mu$ approx.). However, the corresponding luminous efficiency is far too low for a junction or a point rectifier to be used as a source of light.

Applicants have discovered that the low luminous efficiency of such arrangements is due to the fact that semi-conductors have a very high refractive index; taking germanium as an example, the index is $n=4.1$ approximately.

As a result, nearly all the emitted light is totally reflected on the surface separating the semi-conducting body from its environment.

According to the invention, a semi-conducting body is given such a geometrical shape that almost all the light produced in the contact area should fall upon the limiting surface of the body with an angle of incidence such that no total reflection takes place at any point of this surface.

The semi-conducting body, surrounded by the ambient medium (air, for example), may be so designed as to behave like a substantially stigmatic optical system with respect to the contact area constituting the source of light.

The invention will be best understood from the attached drawings showing by way of non-limitative examples, several embodiments of same.

Figure 1 shows schematically the optical behaviour of a semi-conducting body having plane, parallel faces;

Figures 2*a* and 2*b* show the respective transverse cross-section of two embodiments of the invention;

In all these figures, like elements are designated by like reference numbers.

Figures 1, 2A, 2B:
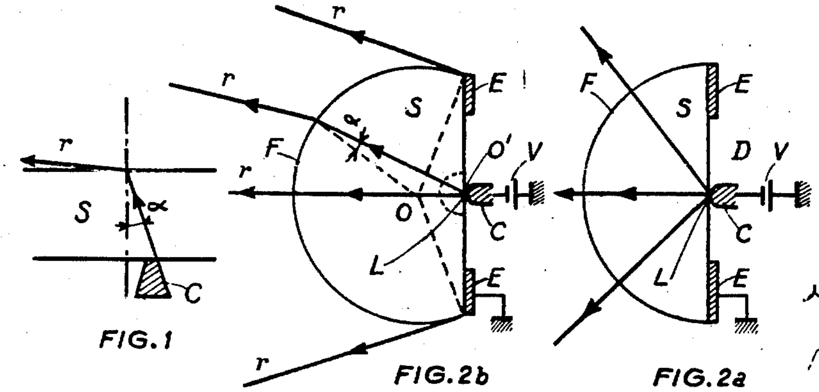

In Figure 1, there will be seen a semi-conductor rectifier consisting of a germanium plate S having plane parallel faces, with a point rectifier contact applied against one of these faces.

It is known that, with a refractive index of about 4, if a given photon is to be emitted out of the semi-conductor, that its angle of incidence $\alpha$ with respect to the emitting face must be of about $\frac{1}{16}$ radian, at the most.

This shows that only a few photons leave the semi-conductor body, and accordingly that the semi-conductor rectifier of Fig. 1 cannot be used as a source of light.

Figures 2*a* and 2*b* show the simplest embodiment of the invention.

A semi-conducting body S, which may for instance be of germanium, is limited by a spherical surface F and a plane surface D against which rests the point contact C. The latter consists of a tapered wire made of bronze, steel or any other metal or alloy used in the manufacture of this type of rectifier. It may be about $\frac{15}{100}$ mm. in diameter. To make the drawing clearer, only the pointed end of the wire is shown. In the case of Figure 2*a*, point C is located at the geometrical centre of the sphere. In Figure 2*b*, the point is located at a Weierstrass point of the sphere whose centre is O. It is known that a Weierstrass point O′ is defined by the equation $$\frac{OO'}{R}=n$$

R being the radius of the sphere and $n$ the refractive index of the semi-conductor. The portion L of the semi-conductor situated in the neighbourhood of the point C may be considered as a source of light and it is in this area that photons are developed. Electrode E is in the form of conducting layer of, say, copper or silver which is electrodeposited or deposited by any other process, and is connected to a source V, the other terminal of which is connected to the point C. In the case of Figure 2*a*, owing to the spherical shape of surface F, the photons emitted by the area L reach this surface normally, thus passing through the surface F without deviation.

In the case of Figure 2*b*, the photons are emitted by the Weierstrass point. The photons reach the surface F with a maximum incidence equal to $$\text{arc sin } \frac{1}{n}$$

In other words, in neither of the two cases, are the photons totally reflected. The paths of the emitted rays are illustrated by the arrows *r*.

In both cases, it is possible to associate with the arrangement shown an optical system (not shown) which focuses the rays into a parallel beam, thus increasing the efficiency of the system.

Figure 3:
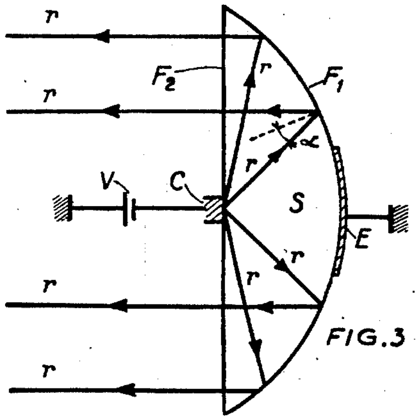
Figures 3, 4 and 5 show, in transverse cross-section, other embodiments of the invention.

In Figure 3, the semi-conducting body displays a face $F_1$ in the shape of a paraboloid, the contact point C being located at the focus of the paraboloid.

It may be of advantage to place the electrode E at the apex of the paraboloid and to have this electrode made of a polished metallic deposit producing total reflection of the incident rays. It is also possible to metallise a great part, if not the whole of the surface of paraboloid $F_1$. A suitable D. C. source V is inserted between the point C and the electrode E.

Those rays that fall upon the face $F_1$ with an angle of incidence smaller than $\alpha$, $\alpha$ being equal to $$\text{arc sin } \frac{1}{n}$$

are reflected by the electrode E in the direction of the paraboloid axis. The rays whose angles of incidence $\alpha$ are at least equal to $$\alpha = \text{arc sin } \frac{1}{n}$$

are totally reflected in the direction of the paraboloid axis. All the reflected rays pass through the face $F_2$ without being deviated.

Figure 4:
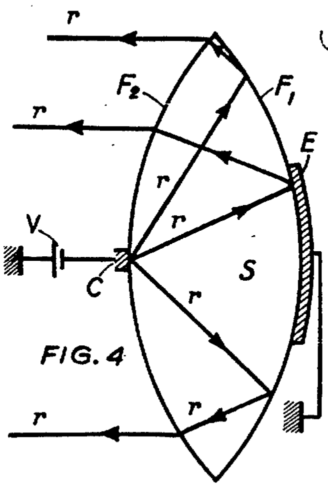

In the alternating embodiment represented in Figure 4, both faces $F_1$ and $F_2$ are curved. They may be of spherical shape and constitute a quasi-stigmatic optical system for the point C and infinity, i. e. a lens for which the point C is the focus. Such surfaces are easier to manufacture than paraboloids. Several devices of this type may be juxtaposed side by side. In both cases, the above mentioned optical system for focussing the emitted rays in the same direction can be dispensed with.

Figures 5, 6:
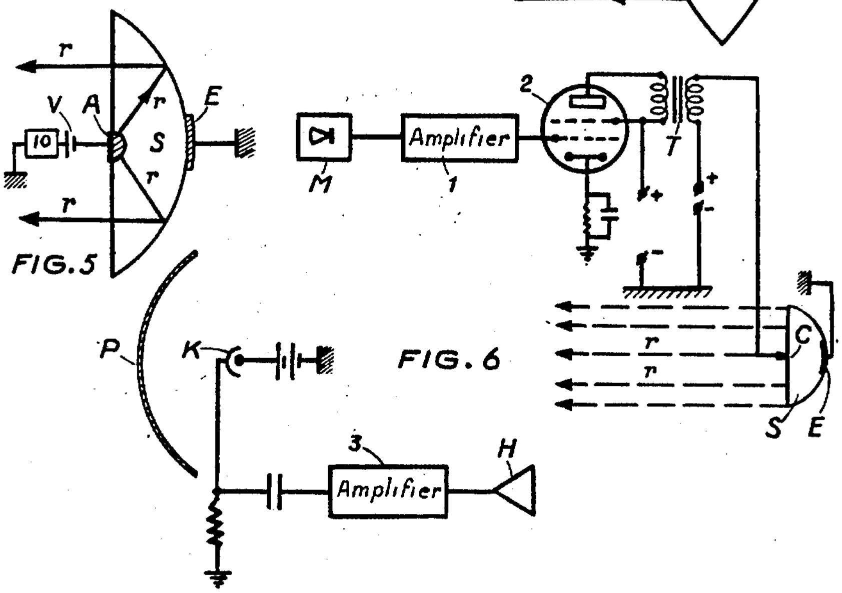
Figure 6 shows a telephone communications system utilising an infra-red emitter according to the invention.

While in the above described embodiments, point rectifiers have been used, it is evident that junction rectifiers can be used as well. Figure 5 shows an example of a device according to the invention making use of a junction rectifier comprising indium and n-type germanium.

The indium converts a portion of the germanium to form the p element of the junction. The electric circuit is formed by welding the conducting leads both to the mass of germanium and to the layer of indium. The operation of this arrangement is substantially the same as that of Figure 3. The transmitted light can be directly modulated by a suitable element 10 which is connected in series with the electric source.

Figure 6 shows very diagrammatically a telephony system using a light transmitter device according to the invention. In this figure, a microphone M is connected to an amplifier 1 connected to a modulator tube 2, the latter in turn being connected, through a transformer T, to the point C of the infra-red emitting device S, for example that shown in Figure 3. The transmitted light beam *r—r* is intensity-modulated by the microphone current. The receiver embodies a paraboloid mirror P at whose focal point is placed a photo-resistive cell K connected to a loudspeaker H, through an amplifier 3. The whole assembly can be realised with miniature type tubes and fed by batteries of low power. It is particularly suitable for realising rugged and compact portable telephone sets.

What we claim is:

1. Infra-red emitting device comprising in combination: a rectifying body of revolution, made of crystalline semi-conducting material, having a first and a second face; a metallic layer, deposited at least over the portion of said first face surrounding the axis of said body; at the centre of said second face a rectifying contact covering a small area of said face a source of direct current energy and connections from said source to said contacts for creating within said body minority carriers; said first face and said second face forming an optical system whose focus is located at the center of said small area, whereby the infra-red radiations emitted by said area are concentrated in a cylindrical beam in the direction of said axis, after reflexion over said first face and refraction across said second face.

2. An infra-red emitting device, comprising in combination: a rectifying body of revolution made of semi-conducting material, having a first and a second face, said first face being plane, said second face being a portion of a sphere; a first contact on said first face; at the center of said first face a second contact over a small area; a source of direct current energy and a connection from said source to said contact; for creating within said body minority carriers; said second face and said first face forming an optical system having a stigmatic point located at the center of said small area, whereby the infra-red radiations emitted by said area leave said body across said second face after refraction thereon.

3. A device according to claim 2, wherein said small area is centered about the center of said sphere.

4. An infra-red emitting device comprising in combination: a rectifying body of revolution, made of crystalline semi-conducting material, having a first and a second face; a conducting element in contact with said body; at the center of said second face, a rectifying contact covering a small area of said face; a source of direct current energy and connections from said source to said contact for creating minority carriers within said body; said first face and said second face forming an optical system having aplanetic and stigmatic points, the center of said small area, which constitutes the emitting source of infra-red radiation, being located at one of said points.

5. An infra-red emitting device, comprising in combination: a rectifying body of revolution made of semi-conducting material, having a first and a second face, said first face being plane, said second face being in the shape of a portion of a sphere; a first contact on said first face; at the center of said first face a second rectifying contact covering a small area of said face; a source of direct current energy and a connection from said source to said rectifying contact, for creating minority carriers within said body; said second face and said first face forming an optical system having a stigmatic point located at the center of said small area and which is one of the Weierstrass points of said sphere, whereby the infra-red radiations emitted by said area leave said body across said second face after refraction thereon.

References Cited in the file of this patent

UNITED STATES PATENTS

| | | |
|---|---|---|
| 2,644,852 | Dunlap | July 7, 1953 |
| 2,683,794 | Briggs et al. | July 13, 1954 |